(12) United States Patent
Manami et al.

(10) Patent No.: US 7,838,584 B2
(45) Date of Patent: *Nov. 23, 2010

(54) GOLF BALL

(75) Inventors: Toshihiko Manami, Chichibu (JP); Eiji Takehana, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 656 days.

This patent is subject to a terminal disclaimer.

(21) Appl. No.: 11/502,440

(22) Filed: Aug. 11, 2006

(65) Prior Publication Data

US 2008/0039563 A1  Feb. 14, 2008

(51) Int. Cl.
*A63B 37/12* (2006.01)
*A63B 37/00* (2006.01)
*C08K 5/09* (2006.01)
*C08L 33/02* (2006.01)

(52) U.S. Cl. .................. 524/322; 524/300; 524/394; 524/400; 473/373; 473/385

(58) Field of Classification Search ............... None
See application file for complete search history.

(56) References Cited

U.S. PATENT DOCUMENTS

| | | | |
|---|---|---|---|
| 3,471,432 A * | 10/1969 | Krol | 524/322 |
| 6,653,382 B1 | 11/2003 | Statz et al. | |
| 6,777,472 B1 | 8/2004 | Statz et al. | |
| 2004/0235586 A1 * | 11/2004 | Chen | 473/351 |
| 2005/0256268 A1 * | 11/2005 | Chen | 525/221 |
| 2006/0166759 A1 * | 7/2006 | Kennedy et al. | 473/371 |
| 2006/0281843 A1 * | 12/2006 | Rajagopalan | 524/322 |
| 2008/0076603 A1 * | 3/2008 | Shindo et al. | 473/367 |

FOREIGN PATENT DOCUMENTS

| | | | |
|---|---|---|---|
| EP | 613700 | * | 9/1994 |
| JP | 03239743 | * | 10/1991 |

OTHER PUBLICATIONS

Nissan Chemical Product literature for "FINEOXOCOL"; year available—2004.*

* cited by examiner

*Primary Examiner*—David Buttner
(74) *Attorney, Agent, or Firm*—Sughrue Mion, PPLC

(57) ABSTRACT

The invention provides a golf ball having a core and a cover of one or more layer, wherein at least one layer of the cover is made of a material obtained by molding a mixture composed of (a) 100 parts by weight of a base resin and (b) 1 to 40 parts by weight of a saturated branched-chain fatty acid or a derivative thereof. The golf ball has a soft, pleasant feel on impact and excellent scuff resistance while retaining a good flight performance. Moreover, it exhibits a highly white appearance that undergoes little discoloration.

Figure 1:
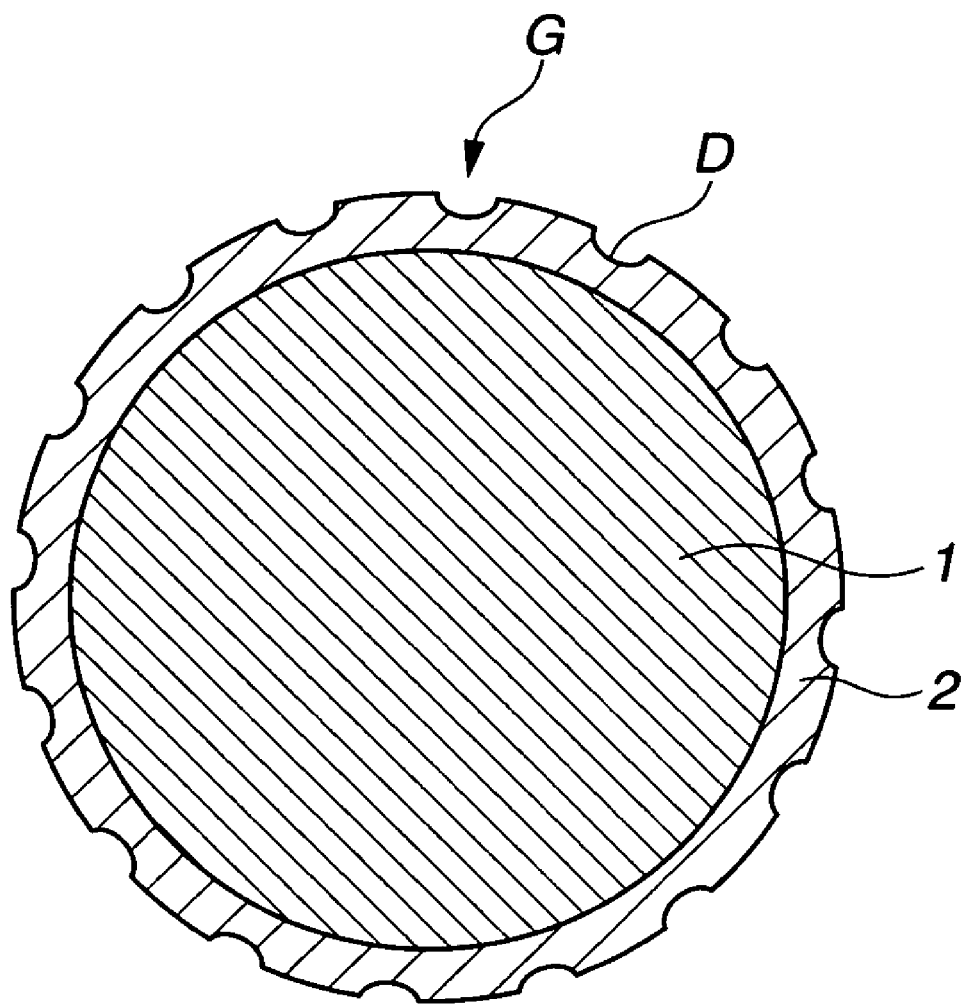

10 Claims, 1 Drawing Sheet

GOLF BALL

BACKGROUND OF THE INVENTION

The present invention relates to a golf ball having a core and cover of one or more layer. More specifically, the invention relates to a golf ball which has both a good feel on impact and excellent scuff resistance while retaining a good flight performance.

Ionomer resins have been widely used of late in golf ball cover materials. Ionomer resins are ionic copolymers of an olefin such as ethylene with an unsaturated carboxylic acid such as acrylic acid, methacrylic acid or maleic acid, in which some of the acidic groups are neutralized with metal ions such as sodium, lithium, zinc or magnesium. In particular, ionomer resins have excellent characteristics such as durability and rebound resilience, and are thus well-suited for use as the base resin in golf ball cover materials.

Ionomer resins account for most of the cover material resin in use today, and enable the production of golf balls endowed with the above properties. Yet, golfers are always on the lookout for golf balls having a high rebound resilience and excellent flight characteristics. Examples of such improvements include the admixture of a third component such as an alkyl acrylate in the base resin for a core material, as described in U.S. Pat. No. 6,653,382 and U.S. Pat. No. 6,777,472. However, given that the oleic acid included in these base resins is an unsaturated fatty acid, such base resins are difficult to use as a cover material because they readily oxidize and undergo increased discoloration under heating. In addition, the inclusion of oleic acid lowers the hardness of the base resin, making it very difficult to adjust the hardness of the base resin to a value that is suitable for a cover material.

Given the importance placed on the feel of the ball when played, the use of a low-hardness ionomer in the cover material has also been proposed. However, the use of a low-hardness ionomer may lower the initial velocity of the ball and reduce the scuff resistance.

SUMMARY OF THE INVENTION

It is therefore an object of the invention to provide a golf ball which, in addition to exhibiting an excellent flight performance, also has been imparted with flexibility, a good feel on impact and excellent scuff resistance.

The inventors have conducted extensive investigations, as a result of which they have discovered that, in a golf ball having a core and a cover of one or more layer, when at least one layer of the cover is made of a material obtained by molding a mixture composed of (a) 100 parts by weight of a base resin and (b) 1 to 40 parts by weight of a saturated branched-chain fatty acid or a derivative thereof, the ball can be imparted with both a good feel and an excellent scuff resistance while retaining a good rebound resilience.

That is, when a conventional saturated straight-chain fatty acid is added to the cover material to confer the golf ball with flexibility and a high scuff resistance, it is difficult to lower the hardness of the ionomer resin or the like serving as the base resin. And when an unsaturated fatty acid such as oleic acid is added to the cover material, it oxidizes due to the heat generated in the molding operation, e.g., injection molding, causing the color of the material to become extremely yellow. In the present invention, by admixing 1 to 40 parts by weight of (b) a saturated branched-chain fatty acid or a derivative thereof per 100 parts by weight of (a) the base resin, there is provided a golf ball having a soft feel, excellent scuff resistance, and a highly white appearance that undergoes little discoloration.

Accordingly, the invention provides the following golf ball.

[1] A golf ball comprising a core and a cover of one or more layer, wherein at least one layer of the cover is made of a material obtained by molding a mixture comprising (a) 100 parts by weight of a base resin and (b) 1 to 40 parts by weight of a saturated branched-chain fatty acid or a derivative thereof.

[2] The golf ball of [1], wherein the mixture comprising components (a) and (b) additionally includes a basic inorganic metal compound capable of neutralizing acid groups in components (a) and (b).

[3] The golf ball of [1], wherein the base resin (a) is one or more selected from among (a1) to (a4) below:

(a1) an olefin-unsaturated carboxylic acid random copolymer, (a2) an olefin-unsaturated carboxylic acid-unsaturated carboxylic acid ester random copolymer, (a3) a metal ion neutralization product of an olefin-unsaturated carboxylic acid random copolymer, and (a4) a metal ion neutralization product of an olefin-unsaturated carboxylic acid-unsaturated carboxylic acid ester random copolymer.

[4] The golf ball of [1], wherein the base resin (a) is (a1) an olefin-unsaturated carboxylic acid random copolymer and/or (a3) a metal ion neutralization product of an olefin-unsaturated carboxylic acid random copolymer.

[5] The golf ball of [1], wherein an outermost layer of the cover is made of the material obtained by molding the mixture comprising components (a) and (b).

[6] The golf ball of [1], wherein the saturated branched-chain fatty acid (b) is at least one selected from the group consisting of isostearic acid, isoarachidic acid, isopalmitic acid, isomyristic acid and isoheptanoic acid.

BRIEF DESCRIPTION OF THE DIAGRAM

FIG. 1 is a cross-sectional view of the internal structure (two-layered) of a golf ball.

DETAILED DESCRIPTION OF THE INVENTION

The invention is described more fully below.

The golf ball of the invention has a core and a cover of one or more layer. The core is not limited to one layer, and may, if necessary, be composed of two or more layers.

A rubber composition obtained by a conventional method and controlled vulcanization conditions, ingredient proportions and the like may be used as the core material. The core formulation will typically include such ingredients as a base rubber, crosslinking agent, co-crosslinking agent and inert filler. Natural rubbers and/or synthetic rubbers hitherto used in solid golf balls may be employed as the base rubber. For example, 1,4-polybutadiene having a cis structure content of at least 40% may be used. If desired, other types of rubber, such as natural rubber, polyisoprene rubber or styrene-butadiene rubber, may be suitably blended with the polybutadiene. The crosslinking agent is exemplified by organic peroxides such as dicumyl peroxide and di-t-butyl peroxide. The co-crosslinking agent is not subject to any particular limitation. Illustrative examples include the metal salts of unsaturated fatty acids, particularly the zinc salts and magnesium salts of unsaturated fatty acids having 3 to 8 carbon atoms (e.g., acrylic acid, methacrylic acid). Examples of inert fillers include zinc oxide, barium sulfate, silica, calcium carbonate and zinc carbonate. Aside from the foregoing rubber composition, use may be made of a thermoplastic resin or thermoplastic elastomer, such as an ionomer resin or a polyester elastomer, as the solid core material.

The solid core may be produced by using a known process to cure/vulcanize a rubber composition containing the various above ingredients. For example, core production may involve masticating the ingredients using a mixing apparatus such as a Banbury mixer or roll mill, compression molding or injection molding the masticated material in a core mold, then curing the molded body by suitably heating at a temperature sufficient for the peroxide and co-crosslinking agent to act. To illustrate, when dicumyl peroxide is used as the peroxide and zinc acrylate is used as the co-crosslinking agent, heating is typically carried out at from 130 to 170° C., and preferably 150 to 160° C., for a period of 10 to 40 minutes, and preferably 12 to 20 minutes.

The hardness of the solid core is not subject to any particular limitation and may be adjusted as appropriate. The core may have a hardness distribution such that the hardness is substantially the same from the center to the surface of the core, or the core may have a hardness difference between the center and surface thereof.

It is desirable for the solid core to have a diameter of at least 25 mm, and preferably at least 36 mm, but not more than 42 mm, and preferably not more than 24 mm. The core weight is preferably from 20 to 32 g, and more preferably from 27 to 30 g.

In the present invention, at least one layer of the cover of one or more layers is made of a cover material composed of, in admixture, 100 parts by weight of a base resin and from 1 to 40 parts by weight of a saturated branched-chain fatty acid or a salt thereof.

A thermoplastic resin or a thermoplastic elastomer may typically be used as the base resin serving as component (a). Of these, the base resin (a) is one or more selected from among (a1) to (a4) below:

(a1) an olefin-unsaturated carboxylic acid random copolymer, (a2) an olefin-unsaturated carboxylic acid-unsaturated carboxylic acid ester random copolymer, (a3) a metal ion neutralization product of an olefin-unsaturated carboxylic acid random copolymer, and (a4) a metal ion neutralization product of an olefin-unsaturated carboxylic acid-unsaturated carboxylic acid ester random copolymer.

Here, the olefin in component (a) is generally one having at least 2 carbons, but not more than 8 carbons, and preferably not more than 6 carbons. Illustrative examples include ethylene, propylene, butene, pentene, hexene, heptene and octene. Ethylene is especially preferred.

Examples of the unsaturated carboxylic acid include acrylic acid, methacrylic acid, maleic acid and fumaric acid. Acrylic acid and methacrylic acid are preferred.

The unsaturated carboxylic acid ester is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Of these, butyl acrylate (n-butyl acrylate, i-butyl acrylate, tert-butyl acrylate) is especially preferred.

The random copolymer of components (a1) and (a2) of the invention may be obtained by random copolymerization of the foregoing ingredients according to a known method. It is recommended that the content of unsaturated carboxylic acid (acid content) included in the random copolymer be generally at least 2 wt % (here and below, "wt %" stands for percent by weight), preferably at least 6 wt %, and more preferably at least 8 wt %, but not more than 25 wt %, preferably not more than 20 wt %, and more preferably not more than 18 wt %. If the acid content is too low, the rebound resilience may decrease. On the other hand, if the acid content is too high, the processability may decrease.

The random copolymer neutralization product of components (a3) and (a4) of the invention may be obtained by neutralizing some of the acid groups on the random copolymer with metal ions. Illustrative examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, $Na^+$, $Li^+$, $Zn^{++}$ and $Mg^{++}$ are preferred, and $Zn^{++}$ is especially recommended. The degree to which the random copolymer is neutralized by these metal ions is not subject to any particular limitation. The neutralization product may be obtained by a known method, such as one that involves introducing to the random copolymer a suitable compound, examples of which include formates, acetates, nitrates, carbonates, bicarbonates, oxides, hydroxides and alkoxides of the above metal ions.

Illustrative examples of the random copolymers serving as components (a1) and (a2) of the invention include Nucrel AN4311, Nucrel AN4318 and Nucrel 1560 (all products of DuPont-Mitsui Polychemicals Co., Ltd.). Illustrative examples of the random copolymer neutralization products serving as components (a3) and (a4) of the invention include Himilan 1554, Himilan 1557, Himilan 1601, Himilan 1605, Himilan 1706, Himilan 1855, Himilan 1856, Himilan AM7315, Himilan AM7316, Himilan AM7317, Himilan AM7318 and Himilan AM7331 (all products of DuPont-Mitsui Polychemicals Co., Ltd.), and Surlyn 6320, Surlyn 7930, Surlyn 8120, Surlyn 8150, Surlyn 8220 and Surlyn 9150 (all products of E.I. DuPont de Nemours & Co.).

In the practice of the invention, the random copolymer and/or a neutralization product thereof used as the base resin serving as component (a) may be one of these alone or may be a combination of both the random copolymer with a neutralization product thereof. If both are used in combination, the proportions therebetween are not subject to any particular limitation.

In the invention, it is preferable for the base resin serving as component (a) to be (a1) an olefin-unsaturated carboxylic acid random copolymer and/or (a3) a metal ion neutralization product of an olefin-unsaturated carboxylic acid random copolymer. The reason is that, although using the subsequently described saturated branched-chain fatty acid with the above metal ion neutralization product of a binary copolymer serving as component (a) is essential for imparting the inventive golf ball with a soft feel and an excellent scuff resistance, a binary copolymer better plasticizes the overall cover material than does a ternary copolymer.

The copolymer or metal ion neutralization product serving as component (a) has a Shore D hardness which, while not subject to any particular limitation, is preferably at least 45, more preferably at least 48, and even more preferably at least 50. Given that component (a) serves as the base resin of the cover material, and that the material hardness of the base resin is largely responsible for the hardness, durability and scuff resistance of the ball, it is desirable to set the Shore D hardness of component (a) within the foregoing range.

In the practice of the invention, a saturated branched-chain fatty acid or a derivative thereof is used as component (b). The number of carbons on one molecule of this saturated branched-chain fatty acid is preferably at least 5, more preferably at least 6, and even more preferably at least 7. It is recommended that the upper limit be preferably not more than 40, and more preferably not more than 30.

A saturated branched-chain fatty acid or a derivative thereof is used as component (b) because a greater hardness-lowering effect on the cover base resin can be achieved in this way than with an ordinary saturated straight-chain fatty acid (e.g., stearic acid, which has 18 carbons), enabling a soft feel on impact to be readily imparted to the cover. Moreover, saturated branched-chain fatty acids are generally liquid and thus have a high molecular mobility, in addition to which they have no unsaturated bonds. By using the above materials in the practice of the invention, the base resin can be plasticized in a very stable state with respect to heat. Moreover, unsaturated fatty acids such as oleic acid readily incur oxidation under the effect of heat, resulting in greater discoloration and considerable deterioration at the surface of the cover. By contrast, when a saturated branched-chain fatty acid or a derivative thereof is used, the cover surface does not readily discolor and significant deterioration in the degree of whiteness does not occur.

Preferably, the saturated branched-chain fatty acid used as component (b) is selected from among higher iso-fatty acids such as isostearic acid (18 carbons), isoarachidic acid (20 carbons), isopalmitic acid (16 carbons), isomyristic acid (13 carbons) and isoheptanoic acid (7 carbons). These may be used singly or as combinations of two or more thereof.

A saturated branched-chain fatty acid derivative in which the proton on the acidic group of a saturated branched-chain fatty acid has been substituted may be used as component (b). Examples of such fatty acid derivatives include metal soaps in which substitution has been carried out with a metal ion. Illustrative examples of metal ions that may be used in such a metal soap include $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. $Ca^{++}$, $Mg^{++}$ and $Zn^{++}$ are especially preferred.

The amount of component (b) used per 100 parts by weight of component (a) is at least 1 part by weight, preferably at least 5 parts by weight, and more preferably at least 10 parts by weight. At less than 1 part by weight, it may not be possible to lower the hardness of the ionomer resin to the desired hardness value. The upper limit in the amount of component (b) per 100 parts by weight of component (a) is 40 parts by weight, preferably 35 parts by weight, and more preferably 30 parts by weight. Above this amount, component (b) is difficult to fully incorporate into the resin and tends to bleed.

As indicated above, an unsaturated fatty acid is included as component (b) in the practice of the invention, but the amount of this saturated branched-chain fatty acid is relatively low and so should not lead to obstacles such as molding defects.

In the practice of the invention, a basic inorganic metal compound capable of neutralizing acid groups in above components (a) and (b) may be included, although such a compound need not serve as an essential component. When a basic inorganic metal compound is included, it neutralizes un-neutralized carboxyl groups within the ionomer resin and carboxyl groups in component (b), thereby forming a metal salt. This results in strong crosslinkages, enhancing the scuff resistance. Moreover, by using a basic inorganic metal compound to neutralize acid groups in above components (a) and (b), the rebound resilience and processability can be freely controlled.

Illustrative examples of the metal ions used in the basic inorganic metal compound include $Li^+$, $Na^+$, $K^+$, $Ca^{++}$, $Mg^{++}$, $Zn^{++}$, $Al^{+++}$, $Ni^+$, $Fe^{++}$, $Fe^{+++}$, $Cu^{++}$, $Mn^{++}$, $Sn^{++}$, $Pb^{++}$ and $Co^{++}$. Basic inorganic fillers containing these metal ions may be used as the inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. The use of calcium hydroxide, which has a high reactivity with the ionomer resin, is especially preferred.

The above basic inorganic metal compound is included in an amount, per 100 parts by weight of component (a), of at least 1 part by weight, preferably at least 1.2 parts by weight, and more preferably at least 1.5 parts by weight. Below this amount, the degree of neutralization falls shorts and a sufficient rebound resilience cannot be achieved. The upper limit in the amount of the basic inorganic metal compound per 100 parts by weight of component (a) is not more than 10 parts by weight, preferably not more than 7 parts by weight, and more preferably not more than 6 parts by weight.

Other materials may be suitably included in the mixture of components (a) and (b), although it is recommended that the mixture have a melt mass flow rate (measured in accordance with JIS-K7210 at a test temperature of 190° C. and under a test load of 21 N (2.16 kgf)) of preferably at least 1.0 g/10 min, and more preferably at least 1.5 g/10 min, but preferably not more than 8 g/10 min, and more preferably not more than 5 g/10 min. If the melt mass flow rate of the hot mixture is too low, the processability will markedly decline.

Various additives may be optionally included in the mixture. For example, when the mixture is to be used as a cover material, additives such as pigments, dispersants, anti-degradants, oxidation inhibitors, heat deterioration inhibitors and light stabilizers may be included therein. Exemplary oxidation inhibitors include (1) primary oxidation inhibitors such as phenolic and amine compounds having a peroxy radical-scavenging effect, and (2) secondary oxidation inhibitors composed of phosphorus compounds, sulfur and the like having a peroxide-decomposing effect. Exemplary heat deterioration inhibitors include phenolic and amine compounds having a carbon radical-scavenging effect. Examples of light stabilizers include benzotriazole, benzophenone, benzoate, triazine, cyanoacrylate and hindered amine compounds.

Moreover, to improve the feel of the ball on impact, in addition to the foregoing essential ingredients, various non-ionomeric thermoplastic elastomers may be included in the above material. Examples of such non-ionomeric thermoplastic elastomers include olefin elastomers, styrene elastomers, ester elastomers, and urethane elastomers. The use of olefin elastomers and styrene elastomers is especially preferred.

The mixing method used to obtain the above mixture is not subject to any particular limitation. For example, mixture may be carried out at a heating temperature of from 150 to 250° C. using as the mixing apparatus an internal mixer such as a kneading-type twin-screw extruder, a Banbury mixer or a kneader. No limitation is imposed on the method of incorporating the various additives other than above essential ingredients (a) and (b). Examples include a method in which the additives are compounded with the above essential ingredients and simultaneously mixed under applied heat, and a method in which the essential ingredients are first mixed under heating, then the optional additives are added, followed by additional mixing under applied heat. In particular, when a co-rotating twin-screw extruder is used, the unsaturated fatty acid may be injected from various vent ports on the twin-screw extruder using a plunger-type pump. The basic inorganic metal compound may be added from any desired point using a side feed.

To obtain the cover in the invention, use may be made of a method which involves placing within a mold a single-layer core or a multi-layer core of two or more layers that has been pre-fabricated according to the type of ball, mixing and melting the above mixture under applied heat, and injection-molding the molten mixture so as to encase the core within the desired cover. In this way, the cover-forming operation can be carried out in a state that ensures an outstanding heat stability, flow and moldability, enabling the golf ball ultimately obtained to have a high rebound resilience and also a good feel on impact and excellent scuff resistance. Alternatively, the method used to form the cover may be one in which, first, a pair of hemispherical half-cups is molded from the cover material of the invention, following which the half-cups are placed over a core and molded under pressure at 120 to 170° C. for 1 to 5 minutes.

In the practice of the invention, the cover is not limited to one layer only, and may instead be formed so as to have a multilayer structure of two or more layers. If the cover has one layer, the thickness is preferably from 0.5 to 3 mm. If the cover has two layers, it is preferable for the outer cover layer to have a thickness in a range of 0.5 to 2.0 mm and for the inner cover layer to have a thickness in a range of 0.5 to 2.0 mm. When the cover has a multilayer structure, the cover material of the invention may be used either at the inner side of the multilayer structure or in the outermost layer cover. However, in the present invention, use as the outermost layer is preferred. That is, when the cover is formed of two or more layers, to obtain a good feel and to provide an even better scuff resistance, it is advantageous for a molded material obtained from the mixture containing above components (a) and (b) to be used as the chief material of the outermost layer.

It is desirable for the respective layers making up the cover (cover layers) to have a Shore D hardness of at least 40, and preferably at least 45, but not more than 65, and preferably not more than 63.

The surface of the outermost layer of the cover may have a plurality of dimples formed thereon, and the cover may be administered various treatments, such as surface preparation, stamping and painting. In particular, when such surface treatment is administered to a golf ball cover made of the cover material of the invention, the ease of operation is good on account of the good moldability of the cover surface.

The present invention provides a golf ball in which a material obtained by molding the above mixture is used in at least one cover layer. The type of golf ball is not subject to any particular limitation, provided the ball has a core and at least one cover layer. Exemplary golf balls include, as shown in FIG. 1, solid golf balls, such as two-piece and three-piece solid golf balls having a core encased by a cover and multi-piece golf balls with a structure of three or more layers; and thread-wound golf balls having a thread-wound core encased by a cover of one layer or having a multilayer structure of two or more layers. The golf ball G in FIG. 1 has a two-layer structure composed of a single-layer core 1 and a single-layer cover 2. Numerous dimples D are formed on the surface of the cover.

The golf ball of the invention, which can be manufactured so as to conform with the Rules of Golf for competitive play, may be produced to a ball diameter of not less than 42.67 mm and a weight of not more than 45.93 g. The golf ball of the invention may be suitably used in all competitive play, whether by amateur golfers having a head speed of 30 to 40 m/s or by professional golfers having a head speed of 45 m/s.

As described above, the golf ball of the invention has both a soft, pleasant feel on impact and an excellent scuff resistance while retaining a good flight performance. Moreover, it exhibits a highly white appearance which undergoes little discoloration.

EXAMPLES

Examples of the invention and Comparative Examples are given below by way of illustration, and not by way of limitation.

Examples 1 to 9

Comparative Examples 1 to 6

Using a core material composed primarily of the polybutadiene shown in Table 1 below, a solid core with a diameter of 36.6 mm, a weight of 31.3 g, and a deflection of 3.5 mm was produced. The deflection was the measured amount of deformation by the core when compressed under a final load of 1,275 N (130 kgf) from an initial load of 98 N (10 kgf).

TABLE 1

|  |  | Amount (pbw) |
|---|---|---|
| Formulation | Polybutadiene | 100 |
|  | Peroxide (1) | 0.3 |
|  | Peroxide (2) | 0.3 |
|  | Zinc oxide | 30.6 |
|  | Antioxidant | 0.1 |
|  | Zinc acrylate | 28.5 |
|  | Zinc stearate | 5.0 |
|  | Zinc salt of pentachlorothiophenol | 1.0 |
| Specific gravity |  | 1.2 |
| Properties | Diameter (mm) | 36.6 |
|  | Weight (g) | 31.3 |
|  | Deflection (mm) | 3.5 |

Details of the above formulation are provided below.

Butadiene rubber: A grade of BR730 available from JSR Corporation.

Peroxide (1): Dicumyl peroxide, available from NOF Corporation under the trade name Percumyl D.

Peroxide (2): A mixture of 1,1-bis(t-butylperoxy)-3,3,5-trimethylcyclohexane and silica, available from NOF Corporation under the trade name Perhexa C40.

Antioxidant: Nocrac NS-6 (trade name), available from Ouchi Shinko Chemical Industry Co., Ltd.

Zinc stearate: Zinc Stearate G (trade name), available from NOF Corporation.

Next, an intermediate layer material of the composition shown in Table 2 was injection-molded to a thickness of 1.55 mm in a mold within which the above solid core had been placed. The cover material indicated in Table 3 or 4 was then mixed in a co-rotating twin-screw extruder (screw diameter, 32 mm; L/D=32; motor capacity, 7.5 kw; with vacuum vent) at 200° C. The resulting mixture was injected into a mold within which the intermediate layer material-covered core had been placed, and injection-molded to a cover thickness of 1.5 mm, thereby producing a three-piece solid golf ball having a diameter of 42.7 mm. The surface of the golf ball obtained in each example was coated with a non-yellowing urethane resin-based paint. The properties (initial velocity, feel on impact, scuff resistance, etc.) of the golf balls obtained in each example were evaluated as described below. The results are presented in Table 5 (examples according to the invention) and Table 6 (comparative examples).

TABLE 2

| Formulation | AM7331 | Amount (pbw) |
|---|---|---|
| | AM7331 | 85 |
| | Dynaron 6100P | 15 |
| | Behenic acid | 20 |
| | Calcium hydroxide | 2.9 |
| | Calcium stearate | 0.15 |
| | Zinc stearate | 0.15 |
| Specific gravity | | 0.95 |
| Weight (g) | | 6.74 |
| Properties* | Diameter (mm) | 39.7 |
| | Weight (g) | 38.0 |
| | Deflection (mm) | 3.3 |

*For a sphere composed of the core encased by the intermediate layer.

Details of the above formulation are provided below.

AM7331: An ionomer resin of ethylene-methacrylic acid-acrylic acid ester copolymer neutralized with sodium ions (available from DuPont-Mitsui Polychemicals Co., Ltd.

Dynaron 6100P: A hydrogenated polymer (olefin-based thermoplastic elastomer) available from JSR Corporation.

Behenic acid: NAA-222S (trade name), available from NOF Corporation as a powder.

Calcium hydroxide: CLS-B (trade name), available from Shiraishi Calcium Kaisha, Ltd.

Calcium stearate: Nissan Calcium Stearate (trade name), available from NOF Corporation.

Zinc stearate: Nissan Zinc Stearate (trade name), available from NOF Corporation.

TABLE 3

| | | Example |||||||||
|---|---|---|---|---|---|---|---|---|---|---|
| | | 1 | 2 | 3 | 4 | 5 | 6 | 7 | 8 | 9 |
| Resin formulation | Himilan 1706 | 100 | 100 | 100 | 50 | 100 | 100 | 50 | 100 | 100 |
| | Himilan 1605 | | | | 50 | | | 50 | | |
| | Himilan 1855 | | | | | | | | | |
| | Himilan 1601 | | | | | | | | | |
| | Himilan 1557 | | | | | | | | | |
| | AM7331 | | | | | | | | | |
| Fatty acid | Oleic acid | | | | | | | | | |
| | Stearic acid | | | | | | | | | |
| | Behenic acid | | | | | | | | | |
| | Isostearic acid-N | 10 | 20 | 30 | 20 | | | | | |
| | Isoarachidic acid | | | | | 20 | 30 | 20 | | |
| | Isostearic acid | | | | | | | | 20 | 30 |
| Neutralizing compound | Calcium hydroxide Ca(OH)$_2$ | | 1 | 2.1 | 1.5 | 0.9 | 2 | 1.4 | 0.5 | 1.5 |
| Additives | Titanium oxide TiO$_2$ | 3 | 3 | 3 | 3 | 3 | 3 | 3 | 3 | 3 |
| | Magnesium stearate Mg-St | | | | | | | | | |
| | Blue pigment | 0.05 | 0.05 | 0.05 | 0.05 | 0.05 | 0.05 | 0.05 | 0.05 | 0.05 |
| Properties | MFR (190° C., g/10 min) | 1.9 | 2.7 | 2.6 | 2.4 | 2.0 | 2.7 | 2.2 | 2.3 | 3.2 |
| | Specific gravity | 0.98 | 0.98 | 0.98 | 0.98 | 0.98 | 0.97 | 0.97 | 0.98 | 0.98 |
| | Shore D hardness | 54 | 54 | 51 | 58 | 55 | 52 | 59 | 56 | 55 |

Note: Numbers for the respective components indicate parts by weight.

TABLE 4

| | | Comparative Example ||||||
|---|---|---|---|---|---|---|---|
| | | 1 | 2 | 3 | 4 | 5 | 6 |
| Resin formulation | Himilan 1706 | 100 | 100 | | 50 | | |
| | Himilan 1605 | | | | 50 | | |
| | Himilan 1855 | | | 100 | | | 20 |
| | Himilan 1601 | | | | | 50 | |
| | Himilan 1557 | | | | | 50 | 30 |
| | AM7331 | | | | | | 50 |
| Fatty acid | Oleic acid | | | 20 | | | |
| | Stearic acid | | 20 | | | | |
| | Behenic acid | | | | 20 | | |
| | Isostearic acid-N | | | | | | |
| | Isoarachidic acid | | | | | | |
| | Isostearic acid | | | | | | |
| Neutralizing compound | Calcium hydroxide Ca(OH)$_2$ | 2 | 2 | 1.5 | | | |
| Additives | Titanium oxide TiO$_2$ | 3 | 3 | 3 | 3 | 3 | 3 |
| | Magnesium stearate Mg-St | | | | 1 | 1 | 1 |
| | Blue pigment | 0.05 | 0.05 | 0.05 | 0.05 | 0.05 | 0.05 |
| Properties | MFR (190° C., g/10 min) | 1.9 | 2.0 | 2.2 | 1.8 | 2.0 | 2.1 |
| | Specific gravity | 0.99 | 0.99 | 0.99 | 0.98 | 0.97 | 0.97 |
| | Shore D hardness | 62 | 55 | 55 | 64 | 61 | 54 |

Details of the above formulations are provided below.

(I) Himilan 1706 (trade name): Ionomer resin of ethylene-methacrylic acid copolymer neutralized with zinc ions, available from DuPont-Mitsui Polychemicals Co., Ltd. (Shore D hardness, 64).

(II) Himilan 1605 (trade name): Ionomer resin of ethylene-methacrylic acid copolymer neutralized with sodium ions, available from DuPont-Mitsui Polychemicals Co., Ltd. (Shore D hardness, 65).

(III) Himilan 1855 (trade name): Ionomer resin of ethylene-methacrylic acid-acrylic acid ester copolymer neutralized with zinc ions (Shore D hardness, 55).

(IV) Himilan 1601 (trade name): Ionomer resin of ethylene-methacrylic acid copolymer neutralized with sodium ions, available from DuPont-Mitsui Polychemicals Co., Ltd. (Shore D hardness, 59).

(V) Himilan 1557 (trade name): Ionomer resin of ethylene-methacrylic acid copolymer neutralized with zinc ions, available from DuPont-Mitsui Polychemicals Co., Ltd. (Shore D hardness, 59).

(VI) AM7331 (trade name): Ionomer resin of ethylene-methacrylic acid-acrylic acid ester copolymer neutralized with sodium ions.

(VII) Stearic acid: NAA-180 (trade name), available from NOF Corporation.

(VIII) Behenic acid: NAA-222S (trade name), available from NOF Corporation as a powder.

(IX) Oleic acid: NAA-300 (trade name), available from NOF Corporation.

(X) Isostearic acid-N: Higher saturated branched-chain fatty acid available from Nissan Chemical Industries, Ltd., and having the following structural formula.

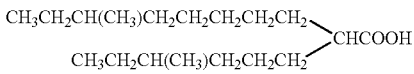

(XI) Isostearic acid: Higher saturated branched-chain fatty acid available from Nissan Chemical Industries, Ltd., and having the following structural formula.

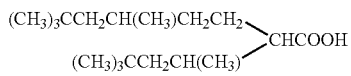

(XII) Isoarachidic acid: Higher saturated branched-chain fatty acid available from Nissan Chemical Industries, Ltd.

(XIII) Calcium hydroxide: CLS-B (trade name), available from Shiraishi Calcium Kaisha, Ltd.

(XIV) Magnesium stearate: Nissan Magnesium Stearate (trade name), available from NOF Corporation.

(XV) Blue pigment: Ultramarine Blue EP-62 (trade name), available from Holliday Pigments.

(XVI) Titanium oxide: Tipaque R550 (trade name), available from Ishihara Sangyo Kaisha, Ltd.

TABLE 5

| | Example | | | | | | | | |
|---|---|---|---|---|---|---|---|---|---|
| | 1 | 2 | 3 | 4 | 5 | 6 | 7 | 8 | 9 |
| Diameter (mm) | 42.7 | 42.7 | 42.7 | 42.7 | 42.7 | 42.7 | 42.7 | 42.7 | 42.7 |
| Weight (g) | 45.5 | 45.5 | 45.5 | 45.5 | 45.5 | 45.5 | 45.5 | 45.4 | 45.4 |
| Deflection (mm) | 3.1 | 3.1 | 3.1 | 3.0 | 3.1 | 3.1 | 3.0 | 3.1 | 3.1 |
| Initial velocity (m/s) | 76.6 | 76.6 | 76.8 | 77 | 76.7 | 76.7 | 77 | 76.4 | 76.2 |
| Scuff resistance | 3.5 | 3.6 | 3.5 | 3.9 | 3.8 | 3.8 | 4.0 | 3.6 | 3.8 |
| Color difference ΔE | 1.6 | 4.5 | 5.8 | 3.8 | 3.8 | 5.3 | 4.3 | 4.3 | 6.2 |
| Appearance (white) | good | good | good to fair | good | good | good to fair | good | good | good to fair |

TABLE 6

| | Comparative Example | | | | | |
|---|---|---|---|---|---|---|
| | 1 | 2 | 3 | 4 | 5 | 6 |
| Diameter (mm) | 42.7 | 42.7 | 42.7 | 42.8 | 42.7 | 42.7 |
| Weight (g) | 45.4 | 45.5 | 45.4 | 45.5 | 45.4 | 45.4 |
| Deflection (mm) | 2.8 | 3.1 | 3.0 | 2.8 | 3.0 | 3.1 |
| Initial velocity (m/s) | 77.5 | 77 | 77 | 77.7 | 77.4 | 76.9 |
| Scuff resistance | 4.3 | 4.2 | 3.4 | 4.3 | 4.0 | 3.2 |
| Color difference ΔE | 2.7 | 9.6 | 3.5 | 0.0 | 0.3 | 0.5 |
| Appearance (white) | good | poor | good | good | good | good |

[Evaluation of Cover Material Properties]

Melt Mass Flow Rate

The melt mass flow rate (or melt index) of the material, as measured in accordance with JIS-K7210 (test temperature, 190° C.; test load, 21 N (2.16 kgf)).

Hardness of Cover Material

The Shore D hardness measured according to ASTM D-2240 is shown.

[Evaluation of Ball Properties]

Ball Deflection (mm)

The amount of deformation (mm) by the golf ball when compressed under a final load of 1,275 N (130 kgf) from an initial load state of 98 N (10 kgf) was determined.

Initial Velocity of Ball (m/s)

The initial velocity (m/s) was measured using an initial velocity measuring apparatus of the same type as that of the official golf ball regulating-body—R&A (USGA), and in accordance with R&A (USGA) rules.

Scuff Resistance

A non-plated X-WEDGE 03 (loft, 52°) manufactured by Bridgestone Sports Co., Ltd. was set in a swing robot, and the ball was hit at a head speed of 33 m/s with the club face open about 30° from square. The surface state of the ball was then visually examined by three golfers having handicaps of 10 or less, and rated according to the following criteria. The average of the ratings obtained for each example is shown in the table.

5: Surface of ball is either completely unchanged or bears a slight imprint from club face.

4: Surface of ball bears a clear imprint from club face, but is not frayed.
3: Surface is conspicuously frayed and scuffed.
2: Surface is frayed and cracked.
1: Some dimples have been obliterated.

Color Difference

The change in color at the surface of the ball was measured using a color difference meter (model MSC-IS-2DH, manufactured by Suga Test Instruments Co., Ltd.), and the color difference ΔE for the ball before and after irradiation was determined based on the Lab color system in accordance with JIS Z 8701. The surface color (color state before irradiation) of the golf ball in Comparative Example 4 was measured, and the difference with this value is indicated in Tables 5 and 6 as the color difference.

Appearance (Whiteness)

The whiteness of the ball surface was visually checked and rated according to the following criteria.
Good: white
Fair: Not sufficiently white
Poor: yellow The results in Tables 3 to 6 show that, relative to the comparative examples, the golf balls of the examples according to the invention had an excellent scuff resistance in spite of their relatively low hardness. Moreover, from Tables 5 and 6, it is apparent that the golf balls in the examples of the invention undergo little change in color at the ball surface, and exhibit a high degree of whiteness and a high-quality appearance. By contrast, in Comparative Example 2, the ball has a low cover hardness and the cover has flexibility, as well as an excellent scuff resistance, but the ball surface has a yellow tinge, which worsens the appearance of the ball.

The invention claimed is:

1. A golf ball comprising a core and a cover of one or more layers, wherein at least one layer of the cover is made of a material obtained by molding a mixture comprising (a) 100 parts by weight of a base resin and (b) 1 to 40 parts by weight of a saturated branched-chain fatty acid,
wherein the base resin (a) is one or more selected from among (a1) to (a4) below:
(a1) an olefin-unsaturated carboxylic acid random copolymer,
(a2) an olefin-unsaturated carboxylic acid-unsaturated carboxylic acid ester random copolymer,
(a3) a metal ion neutralization product of an olefin unsaturated carboxylic acid random copolymer, and
(a4) a metal ion neutralization product of an olefin unsaturated carboxylic acid-unsaturated carboxylic acid ester random copolymer; and
the saturated branched-chain fatty acid is at least one selected from the group consisting of isostearic acid, isoarachidic acid, isopalmitic acid, isomyristic acid and isoheptanoic acid, wherein the isostearic acid has the below structure:

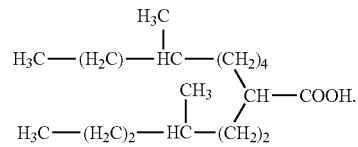

2. The golf ball of claim 1, wherein the mixture comprising components (a) and (b) additionally includes a basic inorganic metal compound capable of neutralizing acid groups in components (a) and (b).

3. The golf ball of claim 1, wherein an outermost layer of the cover is made of the material obtained by molding the mixture comprising components (a) and (b).

4. The golf ball of claim 1, wherein the at least one or more layers making up the cover have a Shore D hardness of from 45 to 59.

5. The golf ball of claim 1, wherein the at least one or more layers making up the cover have a Shore D hardness of from 51 to 59.

6. A golf ball comprising a core and a cover of one or more layers, wherein at least one layer of the cover is made of a material obtained by molding a mixture comprising (a) 100 parts by weight of a base resin and (b) 1 to 40 parts by weight of a saturated branched-chain fatty acid,
wherein the base resin (a) is (a1) an olefin-unsaturated carboxylic acid random copolymer and/or (a3) a metal ion neutralization product of an olefin-unsaturated carboxylic acid random copolymer; and
the saturated branched-chain fatty acid is at least one selected from the group consisting of isostearic acid, isoarachidic acid, isopalmitic acid, isomyristic acid and isoheptanoic acid, wherein the isostearic acid has the below structure:

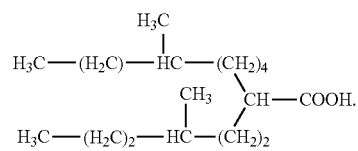

7. The golf ball of claim 6, wherein the mixture comprising components (a) and (b) additionally includes a basic inorganic metal compound capable of neutralizing acid groups in components (a) and (b).

8. The golf ball of claim 6, wherein an outermost layer of the cover is made of the material obtained by molding the mixture comprising components (a) and (b).

9. The golf ball of claim 6, wherein the at least one or more layers making up the cover have a Shore D hardness of from 45 to 59.

10. The golf ball of claim 6, wherein the at least one or more layers making up the cover have a Shore D hardness of from 51 to 59.

* * * * *

UNITED STATES PATENT AND TRADEMARK OFFICE
CERTIFICATE OF CORRECTION

PATENT NO. : 7,838,584 B2  
APPLICATION NO. : 11/502440  
DATED : November 23, 2010  
INVENTOR(S) : Toshihiko Manami and Eiji Takehana Page 1 of 1

It is certified that error appears in the above-identified patent and that said Letters Patent is hereby corrected as shown below:

In Claim 1, column 14, lines 1-8, please delete the formula " 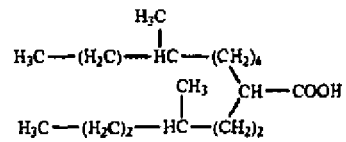 " and insert the following correct formula -- 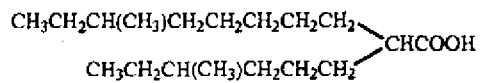 . --

In Claim 6, column 14, lines 37-44, please delete the formula " 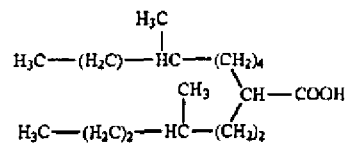 " and insert the following correct formula -- 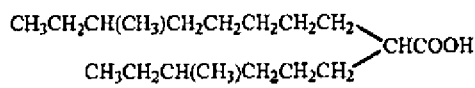 . --

Signed and Sealed this  
Fifteenth Day of May, 2012

David J. Kappos  
*Director of the United States Patent and Trademark Office*